(No Model.)
P. BLAKER.
SPRING TOOTH HARROW OR CULTIVATOR.
No. 453,058. Patented May 26, 1891.
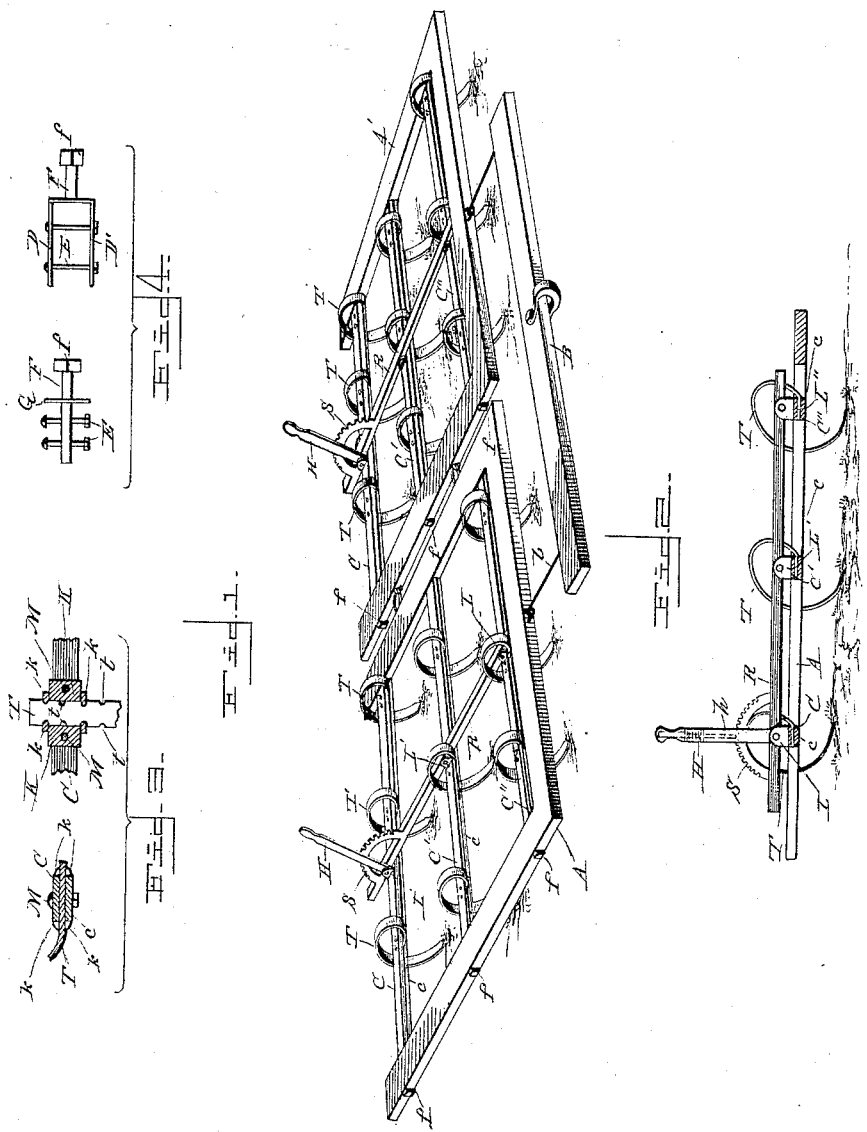
WITNESSES
INVENTOR

UNITED STATES PATENT OFFICE.

PAUL BLAKER, OF NEWTOWN, PENNSYLVANIA.

SPRING-TOOTH HARROW OR CULTIVATOR.

SPECIFICATION forming part of Letters Patent No. 453,058, dated May 26, 1891.

Application filed June 27, 1890. Serial No. 356,958. (No model.)

*To all whom it may concern:*

Be it known that I, PAUL BLAKER, a citizen of the United States, residing at Newtown, in the county of Bucks and State of Pennsylvania, have invented certain new and useful Improvements in Spring-Tooth Harrows or Cultivators; and I do hereby declare the following to be a full, clear, and exact description of the invention, such as will enable others skilled in the art to which it appertains to make and use the same.

My invention consists in the improved form of spring-tooth harrow, with teeth adjustable in unison, hereinafter to be more particularly described and claimed.

In the drawings, Figure 1 is a perspective view of a spring-tooth harrow embodying my invention. Fig. 2 is a vertical section on line *x x* of Fig. 1, showing the adjusting apparatus. Fig. 3 is a detail showing methods of attaching the head of the spring-teeth to the cross-bars on which the teeth are mounted, and Fig. 4 shows detail views of the method of mounting the cross-bars in the main frame.

Heretofore cultivators have been constructed in which the teeth have been arranged so as to be adjusted independently or simultaneously, and various forms of cultivator-frames with pivoted tooth-bars and operating-levers for adjusting the same have also been devised. Various devices have also been employed for adjusting the teeth of cultivators and securing them in the desired adjustment, and hence I do not claim any of these features broadly; but my invention consists in the construction and arrangement of parts substantially as hereinafter described, and particularly pointed out in the claims at the end of this specification.

In the drawings, A represents the frame of a cultivator, which may consist of a single portion A or have connected thereto by suitable links the portion A', forming a double-hinged frame. The bar B, to which the draft-team is attached, is connected to the frame A A' in any suitable manner, as by links *b*. The tooth-bars C C' C'', to which the teeth are secured, are preferably composed of two parts forming divided or split beams, which are pivotally mounted in the frame A A'. I preferably journal said bars in the frame in one of the two methods illustrated in Fig. 4—that is to say, the pivot-pin F, having the nut *f* upon it, passes through the side bar of the frame A A' and provides the desired pivotal bearing. The washer G furnishes a bearing for the end of the tooth-bar against the frame when the latter is drawn up tightly. The extended perforated portion of the pin F in one of the forms illustrated in said Fig. 4 is inserted between the end portions of the tooth-bar, while in the other form illustrated in said figure the branches D D' of the pivot-bolt embrace the end portions of the cross-bar, and in either case the bolts E E pass through the cross-bar and the extension of the pin F and firmly bind the parts together. By this means the pivot-bolts by which the tooth-bars are journaled in the frame are secured to the tooth-bars by the same bolts that secure the ends of the tooth-bars together.

T T represent the cultivator-teeth, which are secured to the rotary or oscillating tooth-bars C C' C'' in the manner indicated more clearly in Fig. 3, which represents a plan and cross-section of the method of securing the teeth. The head of the tooth, as shown, is preferably flattened and has a number of notches *t* cut or stamped in either side thereof. The head of the tooth is then inserted between the divided or split portions of the tooth-bars C *c*, which will yield or spring sufficiently to admit of the insertion of the tooth and also of the cleats K, one of which is placed at either side of the tooth-head *m* and has notches or projections *k* formed thereon, which engage with the notches in the tooth-head, and the several parts are secured together by bolts M, which pass through the tooth-bars and the cleats at either side of the tooth.

The teeth are rendered simultaneously adjustable by means of the oscillating tooth-bars C C' C'', which are connected together by the connecting-rod R, which is pivoted to lugs L L' L'', attached to the tooth-bars and projecting upwardly therefrom, as shown. The desired adjustment is effected by means of a lever H, which is attached rigidly to one of the tooth-bars, as C, and has its fulcrum coincident with the point at which the lug L'' is pivoted to the connecting-rod R. A toothed sector S is fastened to the connecting-rod R, so that its center will coincide with the fulcrum of the lever H, and the spring-latch engaging with said toothed sector locks the lever, and consequently all the teeth, in any desired position of adjustment.

The operation of my invention will be readily understood from the foregoing description. Assuming the lever to be thrown forward in an inclined position, the operator, walking behind the cultivator, grasps the lever H, withdrawing the latch from engagement with the sector S, and then pulls the lever toward him if he wishes to adjust the teeth to deeper furrows, or pushes it from him if he wishes to withdraw them from the furrow, and, having secured the desired adjustment, releases the latch, which will then promptly engage the sector and lock the lever, and consequently the teeth, in the desired position. In the position indicated in Fig. 2 the teeth are represented as at that point of adjustment beyond which any further backward thrust of the lever would result in raising the point of the teeth so as to cause the same to slide upon the ground after the manner of runners, so that the cultivator with the teeth in this adjustment might be readily carried from the field, while the forward thrust of the lever from the position shown in said figure would result in adjusting the teeth so as to cause them to run deeper into the ground.

I am aware that in harrows as heretofore constructed it has been proposed to adjust the tooth-bars of a spring-tooth harrow so as to simultaneously bring the teeth with their convex main portions under the frame, in order that they may serve as runners upon which the implement may be hauled from place to place; but in such constructions it has been necessary to raise the harrow-frame by a forward thrust of the lever and cause the convex main portion of the teeth to act as runners, whereas in my application the simple backward thrust of the lever past the vertical position thereof will throw the points of the teeth forward and cause the same to act as runners, the weight of the harrow assisting in making this adjustment.

Having thus described my invention, I claim as new and desire to secure by Letters Patent—

1. In a cultivator, the combination of a frame and suitable draft connections, divided or split tooth-bars journaled in said frame, pivot-bolts attached to said tooth-bars by bolts or fastenings which join the end portions of said bars together, teeth adjustably mounted between the split portions of said tooth-bars, lugs upon said bars pivoted to a common connecting-rod, a toothed sector on said connecting-rod, and an operating-lever attached to one of the tooth-bars and having a latch adapted to engage said sector, whereby the teeth may be independently or simultaneously adjusted, substantially as described.

2. In a cultivator, the combination, with the divided or split tooth-bar, of the tooth having a flattened head notched at either side thereof and adjustably secured between the split portions of said bar by means of cleats placed at either side of said notched head and having the teats or projections which engage the notches in the tooth-head, and bolts which pass through the divided bars and cleats at either side of the tooth, so as to bind the parts firmly together, substantially as described.

3. In combination with the cultivator-frame provided with divided or split bars journaled therein, spring-teeth having notched tooth-heads adjustably secured between the split portions of said bars by means of cleats placed at either side of the notched heads and having teats or projections which engage said notches, and bolts which pass through the divided bars and cleats at either side of the teeth, substantially as described.

4. In a harrow or cultivator, the combination of the frame, rotatable tooth-bars secured to said frame, curved teeth attached to said tooth-bars, having their points adapted to rest upon the ground in a neutral position, whereby said teeth may be adjusted rearwardly of such position to vary the depth of penetration or thrown forward and upward under the harrow to adapt the teeth to act as runners in transporting the implement from place to place, and mechanism for rotating said tooth-bars, substantially as described.

5. In a cultivator or harrow, the combination, substantially as described, of the frame, the tooth-bars journaled therein, lugs upon said tooth-bars pivoted to a common connecting-rod, a lever mounted on said frame in operative connection with said rod, and curved teeth secured to said tooth-bars with their points adapted to rest upon the ground substantially in the same vertical plane, with a line passing longitudinally through the operating-lever when the latter occupies a position substantially at right angles to the frame-bars, whereby the depth of penetration of the teeth may be varied by the forward or backward movement of the lever or the points of the teeth raised from the ground by a further backward movement of the lever, so as to cause the teeth to act as runners in transporting the implement from place to place, substantially as set forth.

In testimony whereof I affix my signature in presence of two witnesses.

PAUL BLAKER.

Witnesses:
RICHARD BOOTH,
JOHN BLACKFAN.